United States Patent

[11] 3,614,223

[72] Inventor Howard F. Ott
     Victor, N.Y.
[21] Appl. No. 838,849
[22] Filed July 3, 1969
[45] Patented Oct. 19, 1971
[73] Assignee Eastman Kodak Company
     Rochester, N.Y.

[54] LIQUID GATE
     12 Claims, 9 Drawing Figs.
[52] U.S. Cl. .................................................. 355/30,
                                                             355/52
[51] Int. Cl. ....................................................... G03b 27/52
[50] Field of Search ............................................. 355/30, 52,
                                                                        67

[56] References Cited
     UNITED STATES PATENTS
     2,987,955  6/1961  Sassenberg ................... 355/52 X
     3,473,874  10/1969 Hall et al. ...................... 355/52

Primary Examiner—Samuel S. Matthews
Assistant Examiner—E. M. Bero
Attorneys—Walter O. Hodson and Peter C. Bol

ABSTRACT: A film gate adapted for use in a film projection printer, wherein liquid is directed against both surfaces of a film as the film is guided through the gate. The liquid flows from jet orifices positioned near the optical windows of the gate, away from the windows, to vacuum orifices positioned adjacent the entrance and exit ends of the gate. The vacuum orifices remove the liquid from the film. The movement of the fluid from the jet orifices to the vacuum orifices "sweeps" and coats both film surfaces with a liquid layer as the film moves through the gate.

PATENTED OCT 19 1971

HOWARD F. OTT
INVENTOR.

BY

ATTORNEYS

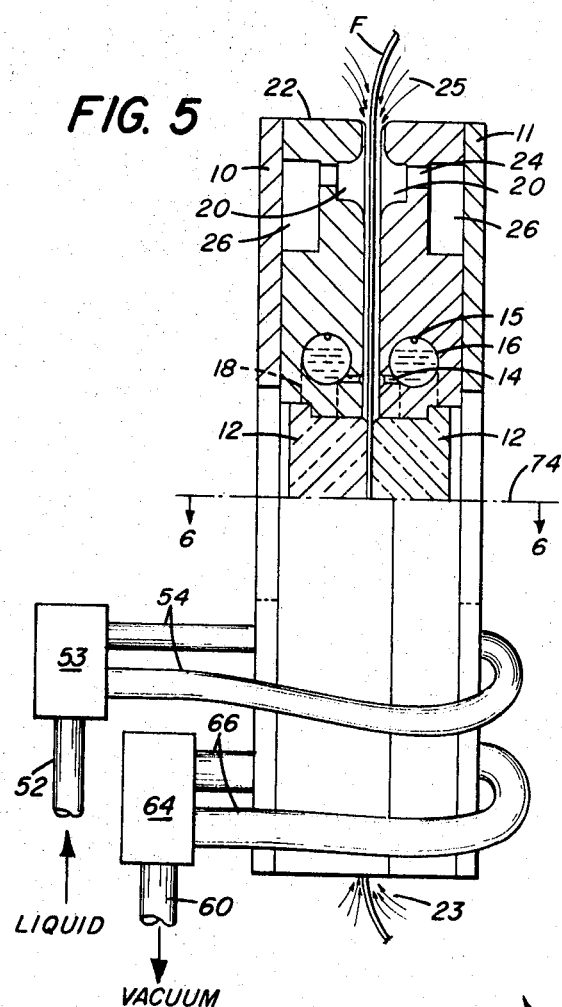
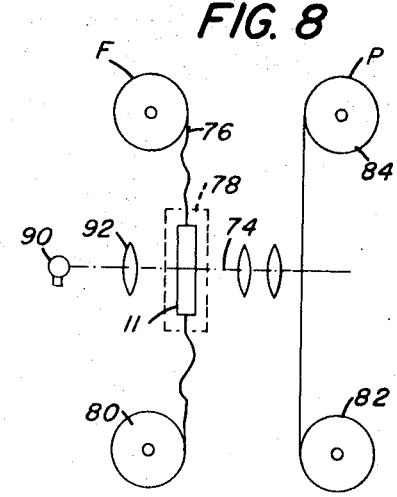
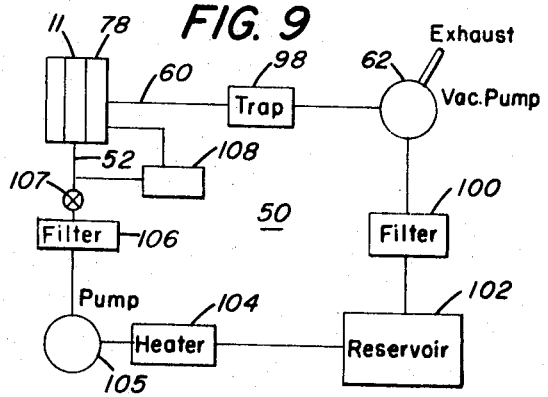
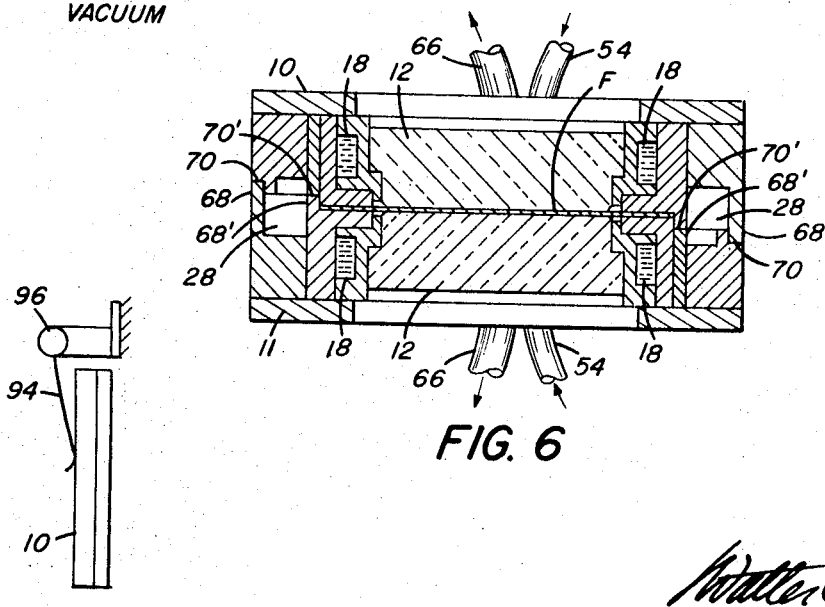

3,614,223

LIQUID GATE

BACKGROUND OF THE INVENTION

This invention relates to a film gate for guiding a photographic film in movement through a predetermined path. In particular, the invention provides a film gate wherein a liquid is directed against both surfaces of a film in a gate to sweep the surfaces of the film immediately before, and after, the film moves past the optical window of the gate. In its presently preferred form, the invention is embodied in a film gate adapted for use in a projection printer for optically printing motion-picture film.

For convenience in describing the present invention, I shall refer to a film containing a developed image as a negative film. I shall refer to an undeveloped photosensitive image-receiving film as a positive film. It should be understood that positive and negative are relative terms and are interchangeable.

In an optical printing apparatus the negative and positive films are guided in optically parallel paths which are perpendicular to the optical axis of the printer at the points of intersection with the axis. The positive film is exposed with the image of the negative film as the films move through the optical axis.

With repeated use a negative sometimes becomes scratched and dirty. If such a scratched and dirty negative is used in a printer to make a positive print, images of the scratches and dirt appear on the positive print reducing the quality of such print.

It has been known in the prior art that if a scratched surface of a film is coated with a liquid having the proper refractive index (close to the refractive index of the support and emulsion of the negative), the scratches become practically imperceptible and are not reproduced on the positive print. This principle is also applicable in contact printing and in projection of a film print onto a screen.

It is also known that by coating a film with a liquid the intensity of the image projected from such film may be increased (such as may be desired in a movie theater). The cooling effect of the liquid on the film permits the use of greater illumination density.

Many devices have been developed in the projection printing field (as well as contact printing and film projection fields) for applying liquid to the film surface for reducing the optical defects caused by scratches. These devices have also served to remove dirt from the film.

One of the simplest forms of these devices has a trough through which the film is guided to wet the surface. The combined application of airstreams and vacuum to the film surface levels the liquid layers before the film passes the optical portion of the printer. In another simple form, a device has used pads saturated with the liquid. The film is guided between the pads to wipe the dirt from the film surfaces and to apply a layer of liquid to the film surface.

More sophisticated devices have been made in the form of a film gate utilized in a projector wherein the liquid is applied to the film to wet an area of the film surface just before it reaches the optical projection aperture of the projector. An example of such a gate is shown in the Feb., 1962 Journal of the SMPTE, Volume 71, No. 2, pp. 100-105.

Although many developments have been made in the film gate technology there remains several critical areas where improvement has been needed. For example, in the optional projection printer it is highly desirable to have a gate that facilitates forward and reverse movement of the film.

Some of the gates presently in use have portions of the liquid system open to the atmosphere. Other gates tend to leak or do not have effective means to completely remove the liquid from the film once it has been applied. Because the materials used in film gates are usually toxic organic solvents, a safety or health hazard can exist if there is leakage at the gate, or in the gate-supply system, or the supply system is open to the atmosphere.

Other gates are so designed that initially only one surface of the film is wetted with liquid. The liquid, if it is to wet both surfaces of the film, must flow through the apertures of the film. Because scratches can occur on both the support surface and emulsion surface of a film it is important to wet both surfaces.

Still other gates do not completely debubble or clean the liquid to insure a uniform coating of liquid on the film surfaces and some gates do not effectively clean the film as the film passes through the gate.

Accordingly, there exists a need for a film gate that solves the above-indicated problems.

SUMMARY OF THE INVENTION

The concepts of the present invention are applicable to various types of apparatus where it is desirable to clean and coat the surfaces of a film or web with a liquid (for example, a motion-picture projector and optical projection printer). For the purposes of describing the present invention, however, I have selected its application to a projection printer.

According to the present invention as the film passes through the gate, the liquid is directed from jet orifices formed in the gate onto the film surfaces to sweep and coat the film surfaces. The liquid flows from the jet orifices positioned near the optical window of the gate away from the window to vacuum orifices formed in the gate near the entrance and exit ends of the gate where it is removed from the film surfaces.

Loose dirt is removed from the surfaces of the film by the vacuum at vacuum orifices located adjacent the entrance end of the gate as the film first enters the gate. The vacuum orifices at the exit end of the gate act as a vacuum "squeegee" to effectively remove liquid from the film surfaces.

The film gate of the present invention and the associated liquid-supply system are substantially leakproof and provide bubble-free, clean fluid for sweeping and coating the surface of the film. The gate is effective regardless of the direction of film movement through the gate.

The gate comprises at least one guide plate for guiding a moving film along a path. The plate defines an optical window. The film is guided past the window in a plane parallel to the plane of the window. The plate further defines a plurality of jet orifices operatively connected to a liquid-supply system and positioned along the edges of the window in a direction substantially transverse the film path. A liquid is directed against the film surface through the orifices to flush the surface and sweep any dirt therefrom. The plate further defines a plurality of vacuum orifices operatively connected to a vacuum source and positioned a distance away from the jet orifices in a direction substantially transverse the film path. The vacuum orifices remove liquid from the film surface and cause liquid to flow from the jet orifice away from the window. A pressure plate is provided for holding the film in operative engagement with the guide plate.

The pressure plate may be replaced by a second guide plate to form a film gate having first and second oppositely positioned guide plates between which the film is guided. A portion of each of the plates defines a light-transmissive window aligned with the window of the opposite gate. The film passes between the windows in a plane parallel to the planes defined by the windows. The plates each define a plurality of jet orifices operatively connected to a liquid-supply system and positioned along the transverse edges of the windows. The jet orifices direct liquid from the supply system against the surfaces of the film. The plates each also define a plurality of vacuum orifices positioned a distance away from the jet orifices in a direction substantially transverse the web path. The vacuum at the orifices causes liquid to flow from the jet orifices away from the window to the vacuum orifices where liquid is removed from the film surface. Vacuum slots are formed in each plate longitudinally along the plate edges to prevent liquid from leaking out of the sides of the gate. The plates are resiliently held into engagement with one another.

The film gate is adaptable for use in a projection printer wherein the film gate is so positioned in the printer that the optical axis of the printer passes through the optical windows of the gate. Liquid is directed onto the film surface to sweep the surface and apply a layer of liquid on the surface before the film reaches the optical axis of the printer. The liquid-supply system and the vacuum source connected to the gate are operatively interconnected so that the liquid is removed from the gate by the vacuum orifices is debubbled and cleaned before the liquid is returned to the gate. The liquid used in the gate has a refractive index that approximates the refractive index of the support base and emulsion of the film.

The various features of novelty which characterize the present invention are pointed out with particularity in the claims annexed to and forming a part of this specification. For a better understanding of the invention, its operating advantages and the specific objects obtained by its use, reference should be had to the accompanying drawings and descriptive matter in which the preferred embodiment of the present invention are illustrated and described.

DESCRIPTION OF THE FIGURES

FIG. 5 is a side view in partial section of the preferred embodiment of the present invention.

FIG. 6 is a section view along line 6—6 of FIG. 5.

FIG. 7 shows a spring engaging the film gate of the present invention.

FIG. 8 is a schematic of a projection printer in which the present invention is incorporated.

FIG. 9 is a schematic of the liquid-supply system for the film gate.

DESCRIPTION OF THE PREFERRED EMBODIMENT

Figure 1:
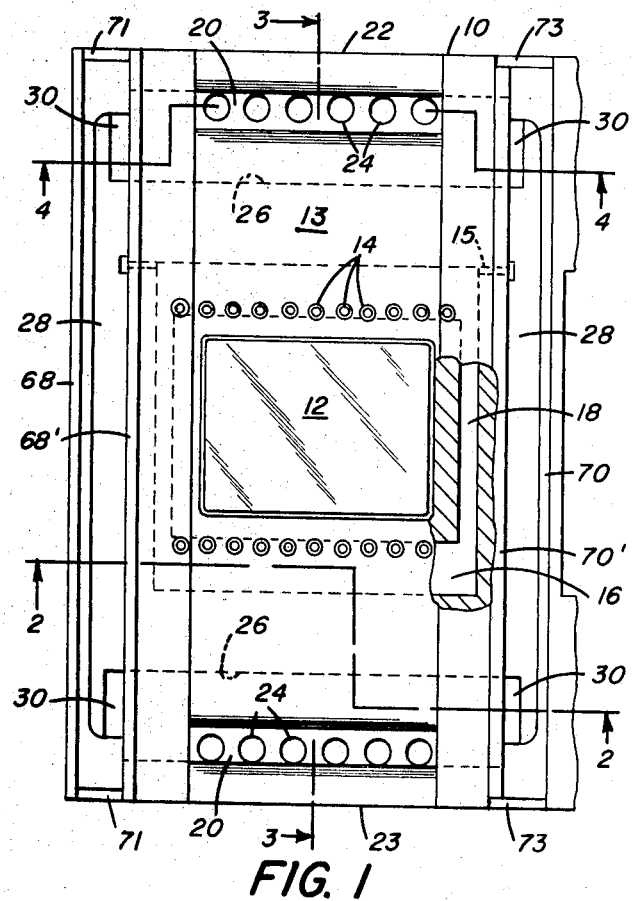
FIG. 1 is a plane view partially cut away of one-half of the film gate in which the concepts of the present invention are embodied.
Figure 3:
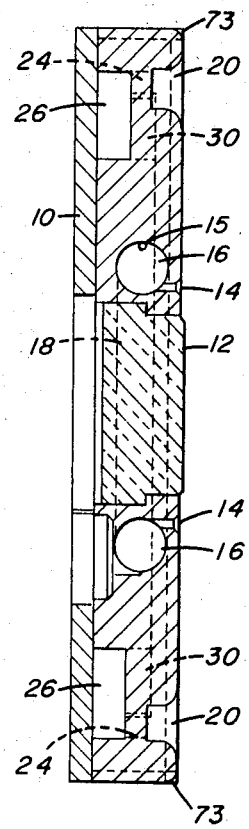
FIG. 3 is a section view along line 3—3 of FIG. 1.
Figure 2:
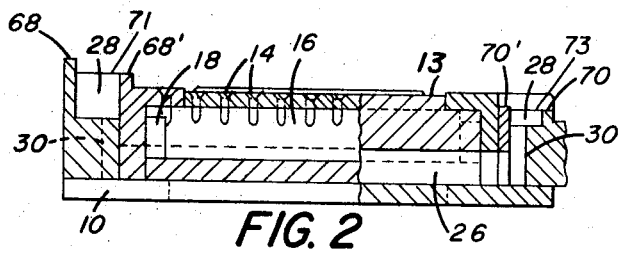
FIG. 2 is a section view along line 2—2 of FIG. 1.
Figure 4:
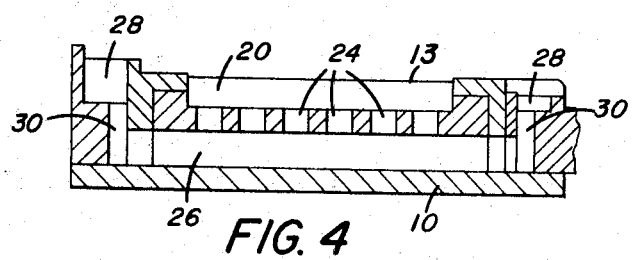
FIG. 4 is a section view along line 4—4 of FIG. 1.

The basic elements of the preferred embodiment of a film gate according to the present invention and adapted for use in a projection printer are shown in FIGS. 1 through 4. The preferred embodiment includes a pair of gate halves such as shown in FIG. 5. For the purposes of clarity, however, my description of the gate initially will be directed to one gate half. In FIG. 1, there is shown a gate half 10 having an optical window 12 made of an optical quality plastic or glass positioned substantially in the center of a guide plate 13. A plurality of jet orifices 14 are disposed in rows along the transverse edges of the window 12. The jet orifices 14 in each row are connected to a respective manifold 16 which is formed below the surface of guide plate 13 below the jet orifices. The manifolds 16 are connected together by means of headers 18 which extend below the surface of the gate half 10 along the sides of the windows 12.

A liquid-supply system 50 (described below) such as shown in FIG. 9 supplies liquid to the jet orifices 14 through tubing and fittings of standard design which connect into the gate half 10. In the preferred embodiment a tube 52 from the supply system connects to a Y or T fitting 53 positioned at or near one of the gate halves as shown in FIG. 5. Shorter lines 54 extend from the fitting to each gate half.

Returning to FIGS. 1 through 4, there are shown transverse vacuum slots 20 which extend across the guide plate 13 of gate half 10 adjacent the entrance 22 and exit 23 ends of the gate half 10. (The terms entrance and exit are relative and depend upon the direction of the film movement through the gate). A plurality of orifices 24 extend along the length of both transverse slots 20 connect the slots 20 to vacuum manifold 26, which are positioned below the transverse slots 20 behind the guide plate 13 surface. Longitudinal slots 28 are positioned along the length of the gate half 10 adjacent the gate half edges. The longitudinal slots 28 are also connected at both ends to the manifolds 26 through risers 30.

The vacuum manifolds 26 are operatively connected to a vacuum source (described below) by a tube 60 which extends from a vacuum pump 62 to a fitting 64 adjacent the gate 10. Individual tubes 66 extend from the fitting 64 to each gate half 10. Vent orifices 15 extend from the upper manifold 16 to the longitudinal slots 30 to vent gas trapped in the manifold 16.

Referring now to FIG. 6, there is shown a section view of the two gate halves 10 in their respective positions when the gate is assembled. The view shows each gate formed so that one side has a pair of ridges 68, 68', and the other side has a pair of corresponding depressions 70, 70' (also shown in FIG. 2). When the gate halves are assembled, the ridges 68, 68' of one gate half fit into the depressions 70, 70' of the opposite half. Similarly, end ridges 71 of one gate fit into end depressions 73 of the opposite gate.

The arrangement of the ridges 68, 68' of one gate half fitting into the corresponding depressions 70, 70' of the other half provides the side seal for the gate. The Figures show the depressions 70, 70' of a gate half immediately adjacent a longitudinal slot 28 for that gate half. The ridges 68, 68' likewise are adjacent the other longitudinal slot 28 for that gage half. When the halves are assembled into a gate, any leakage from the side of the gate between the inside ridge 68' and depression 70' flows into a chamber formed by the opposed side slots 28. The construction of ridges and depressions allows the gate halves to be spread apart for a distance equal to the height of the ridges 68, 68' without losing the vacuum on the gate. Accordingly, the gate will facilitate the passage of splices in a film without the vacuum being disturbed. The longitudinal chambers along with the vacuum slots 20 at the ends of the gate halves form the seal for the gate.

Returning to FIG. 5, there is shown a negative film F passing through the film gate 11 of the present invention. The gate is positioned so that the optical axis 74 of the printer passes substantially through the center of the optical windows 12 of the gate as shown in FIGS. 5 and 8. When the negative film F enters the gate at the entrance end 22, it first passes vacuum chambers 20. The film is initially swept by the air moving from outside the gage into the vacuum chambers 20 as indicated by 25. As the film advances, it is further swept and coated by the liquid which is moving from the set of orifices 14 above the optical windows 12 upwardly to the vacuum slots at the entrance end 22 of the gate. The film then advances to the optical window 12 where a frame of the negative is held over the window by a suitable device so that the image of the frame can be projected onto a positive film P which is positioned a distance along the optical axis 74 of the printer, as shown in FIG. 8.

After the print of the negative F is made, the film advances to the lower portion of the gate where it is further swept and flushed by the liquid moving from the lower jet orifices 14 down toward the vacuum slot 20 adjacent the exit end of the gate 23. As the film moves past the vacuum slot 20 adjacent the exit end 23, the fluid on the film is substantially removed from the film surface.

As previously stated, the present invention is particularly useful in a projection printer, such as shown in FIG. 8. One skilled in the art can easily see how the preferred embodiment of the gate can be adapted for use in a commercially available projection printer. Some printers drive and advance the film by means of sprocket wheels. Many printers are designed with a film advance and holddown mechanism wherein the film is advanced by a pair of pins which engage the film perforations to move the film through the gate. Another set of pins hold the film in place while a print is made of a particular frame. Other printers operate under a continuous projection principle where the negative and positive films are continually moved through the optical axis of the printer.

FIG. 8 shows a schematic of the present film gate, in a typical projection printer. The negative film F is threaded from a first reel 76 through the film advance mechanism 78 and the film gate to a second reel 80. The positive print film P is similarly guided from a first reel 82 to a second reel 84. Both films pass through the optical axis 74 of the printer. The drive and advance of the positive film is coordinated with that of the negative film. The light from the light source 90 passes along the optical axis 74 through the negative film F and the lenses 92 to the positive print film P. The film gate according to the present invention facilitates the movement of film in either direction.

FIG. 7 shows a resilient holding means positioned adjacent one gate half 10 of the film gate. In the preferred embodiment a spring 94 is adaptable to be coordinated with the movement of a film advance mechanism as follows: The tension of the spring is decreased when the film is moving through the gate; the tension of the spring is increased to hold the gate halves together while the film advance mechanism is in the holddown position and a print is being made of the image on the negative film. The increase and decrease of the spring tension can be accomplished by many techniques known in the art. For example: FIG. 7 shows a leaf spring 94 attached to a rotatable shaft 96. The shaft 96 can be rotated through levers or gears (not shown) coordinated with the drive mechanism of the printer to increase and decrease the tension of the spring.

FIG. 9 shows a schematic of a liquid-supply system adapted for use with the present invention. Starting from the gate 11 the vacuum pump 62 creates a vacuum at the vacuum chambers 26 and 28 in the gate 11 and draws the liquid from the gate to a liquid trap 98. Separating liquid from air, the fluid flows from the trap 98 through a filter 100 (for removing dirt) to the reservoir 102. A pump 105 draws the liquid from the reservoir 102 through a heater 104 and forces the fluid through another filter 106, through a check valve 107, to the film gate 11. The liquid used in the film gate can be any one of a number that are commercially available. The liquid is selected for its refractive index and its chemical compatibility with the emulsion and base of the film. Usually the refractive index of the liquid approximates that of the film and the emulsion so that scratches on the film will be imperceptible. We have found that better cleaning of a film is obtained and when the flow of fluid from the supply system is pulsed and coordinated with the advance mechanism. In FIG. 9, there is shown a pulsing unit 108 of commercially available design for timing the flow of fluid to the gate with the cycle of the film advance mechanism 78.

It can also be seen that the present gate and supply system substantially reduce leakage of organic liquids used in the gate which might otherwise cause a health hazard. The vacuum slots at the ends and sides of the gate prevent leakage of fluid at the gate thereby eliminating the evaporation of the liquid into the working space around the printer. The only exhaust in the printer system is from the vacuum pump which is suitably connected to a ventilation system that removes vapors from the working area.

The invention has been described in detail with particular reference to preferred embodiments thereof, but it will be understood that variations and modifications can be effected within the spirit and scope of the invention.

I claim:

1. In a photographic film printer having an optical printing axis and means for synchronously moving a first image-bearing film and a second photosensitive film through respective film paths which intersect said axis and which are substantially optically parallel at such intersections with said axis, an improved film gate for guiding at least said first film through that portion of its path which intersects said axis, for cleaning said first film and for coating said first film with a liquid, said gate comprising:

a pair of cooperating complementary gate halves, which include respective guide plates having opposed guide surfaces adjacent said portion of said path for guiding said first film as it moves through said portion of said path, said guide surfaces having ends defining respectively an entrance and an exit for said film and means for supporting said gate halves in cooperative association, each of said gate halves respectively comprising:

a light-transmissive optical window in said plate forming a section of said guide surface and positioned between said entrance and exit and oriented with said axis passing through said window, said window having first and second edges extending transverse said portion of said path, said first edge being disposed adjacent said entrance and said second edge being disposed adjacent said exit;

said plate defining first and second pluralities of jet orifices adapted to be operatively connected to a liquid-supply system and positioned in said guide surface adjacent said first and second edges respectively for directing liquid onto the film in said portion of said path;

said plate defining vacuum orifices adapted to be operatively connected to a vacuum source and positioned in said guide surface adjacent said entrance and exit respectively for removing liquid from the film in said portion of said path such that the liquid from said first plurality of jet orifices is substantially removed from the film by said vacuum orifices adjacent said entrance and the liquid from said second plurality of jet orifices is substantially removed from the film by said vacuum orifices adjacent said exit.

2. The invention according to claim 1 and wherein said guide plates define longitudinal vacuum slots and adjacent the longitudinal edges of the respective guide surfaces, which slots are adapted to be operatively connected to said vacuum source for removing liquid from said longitudinal edges.

3. The invention according to claim 2 further comprising a liquid supply and a vacuum source, said jet orifices being operatively connected to said liquid supply and said vacuum orifices and slots being operatively connected to said vacuum source.

4. The invention according to claim 3 further including means for pulsing the flow of liquid from said liquid supply to said jet orifices in synchronism with the movement of said film through said gate.

5. A film gate comprising a guide plate having a first end and second end with a film support surface extending therebetween, an optical window formed in said guide plate between said ends, means forming at least one liquid supply orifice in said film support surface between one side of said optical window and said first end of said guide plate, means forming at least one vacuum orifice in said film support surface between the liquid supply orifice and said first end of said guide plate, and means forming a second vacuum orifice in said film support surface between the opposite side of said optical window and said second end of said guide plate.

6. The invention according to claim 5 including a second liquid supply orifice in said film support surface between said opposite side of said optical window and said second vacuum orifice forming means.

7. The invention according to claim 5 including a plate means disposed in parallel spaced alignment with said guide plate and arranged to hold said film in alignment with said film support surface.

8. The invention according to claim 7 wherein said plate means is substantially complementary to said guide plate.

9. The invention according to claim 7 wherein said plate means has a first and second end with a film support surface extending therebetween, an optical window formed in said plate means between said ends, means forming at least one liquid supply orifice in said film support surface of said plate means between one side of said optical window and said first end of said plate means, means forming at least one vacuum orifice in said film support surface of said plate means between the liquid supply orifice and said first end of said plate means, and means forming a second vacuum orifice in said film support surface of said plate means between the opposite side of said optical window and said second end of said plate means, the optical window of said plate means being in alignment with the optical window of the guide plate and the first and second ends of said plate means being arranged in alignment with the first and second ends, respectively, of the guide plate.

10. A film gate arranged to apply liquid to both surfaces of a film passing therethrough, said gate having a pair of guide plates each having a first end and second end with a film support surface extending therebetween, aligned optical windows formed in said guide plates between said ends, means forming at least one liquid supply orifice in each of said film support surfaces between one side of said optical window and said first end of said guide plates, means forming at least one vacuum orifice in each of said film support surfaces between the liquid supply orifice and said first end of said guide plates, and means forming a second vacuum orifice in each of said film support surfaces between the opposite side of said optical windows and said second end of said guide plates.

11. The invention according to claim 10 including a second liquid supply orifice in said film support surface of said plate means between said opposite side of said optical window and said second vacuum orifice forming means in said plate means.

12. The invention according to claim 10 including means for resiliently urging said guide plates together in sealing engagement.